United States Patent
Koskelainen et al.

(10) Patent No.: US 7,085,244 B2
(45) Date of Patent: Aug. 1, 2006

(54) FLOOR CONTROL LANGUAGE

(75) Inventors: Petri Koskelainen, Tampere (FI); Mikko Vainikainen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/384,359

(22) Filed: Mar. 7, 2003

(65) Prior Publication Data

US 2004/0174830 A1 Sep. 9, 2004

(51) Int. Cl.
*H04L 12/16* (2006.01)
(52) U.S. Cl. ............... 370/261; 379/202.01; 455/414.1
(58) Field of Classification Search ................ 370/259, 370/260, 261, 352, 401, 466, 467, 462; 455/414; 379/202.01, 201.01; 709/203, 228, 229
See application file for complete search history.

(56) References Cited

U.S. PATENT DOCUMENTS

| | | | | |
|---|---|---|---|---|
| 5,557,725 | A * | 9/1996 | Ansberry et al. ........... | 715/755 |
| 6,477,150 | B1 * | 11/2002 | Maggenti et al. ........... | 370/312 |
| 6,564,261 | B1 * | 5/2003 | Gudjonsson et al. ....... | 709/227 |
| 2002/0035602 | A1 * | 3/2002 | Garcia-Luna-Aceves et al. ......................... | 709/204 |
| 2004/0071099 | A1 * | 4/2004 | Costa-Requena et al. ... | 370/260 |
| 2004/0125802 | A1 * | 7/2004 | Lillie et al. ................. | 370/390 |

OTHER PUBLICATIONS

"Use of Session Initiation Protocol (SIP) and Simple Object Access Protocol (SOAP) for Conference Floor Control"; Columbia University, Internet Engineering Task Force; Wu et al.; pp. 1-66; Jan. 14, 2003.
"Requirements for Floor Control"; Roxen.com, Internet Engineering Task Force; Koskelainen et al.; pp. 1-9; Oct. 31, 2002.
"Requirements for Tightly Coupled SIP Conferencing"; Roxen.com; Levin et al.; pp. 1-12; Nov. 2002.
"Efficacy of Floor Control Protocols in Distributed Multimedia Collaboration"; Cluster Computing; Dommel et al.; pp. 1-30; 1999.
"A Framework for Conferencing with the Session Initiation Protocol"; Internet Engineering Task Force; J. Rosenberg; pp. 1-57; Oct. 28, 2002.

* cited by examiner

*Primary Examiner*—Duc Ho (57) ABSTRACT

A telecommunications method and system of floor control, for enabling at least one conference participant to access a shared object or resource for purposes of input. A floor control command signal establishes at least one floor control policy, and the floor control command signal includes a floor control language script for automatically determining the access. This access is determined based upon factors such as access requests and prior access history, without need for a floor chair.

20 Claims, 3 Drawing Sheets

FLOOR CONTROL LANGUAGE

TECHNICAL FIELD OF THE INVENTION

The invention relates to telecommunications conferencing, and more particularly to rules and software language for controlling conferences.

BACKGROUND ART

When more than two people participate in a communications session, the session becomes a conference. Conference applications often have shared resources, such as the right to talk, the right to access input into a limited-bandwidth video channel, and/or the right to control a pointer or to otherwise focus attention in a shared application. In many cases, it is desirable to be able to control who can exercise these rights to the shared resource.

This situation is analogous to the ancient problem of running a town meeting, where certain rules must be developed to control access to the floor; these rules are historically known as rules of parliamentary procedure. Similar floor control rules are needed for telecommunications conferencing.

Floor control enables applications or users to gain safe and mutually exclusive or non-exclusive input access to the shared object or resource, and is generally an optional feature for conferencing applications. Floor control has been studied extensively over the years. See, for example, "Efficacy of Floor Control Protocols in Distributed Multimedia Collaboration" by H. Peter Dommel and J. S. Garcia-Luna-Aceves, in Cluster Computing Journal (1999). Floor control has also been the subject of numerous documents of the Internet Engineering Task Force (IETF).

We define a floor as the temporary permission for a conference participant to access or manipulate a specific shared resource or group of resources. Session Initiation Protocol (SIP) conferencing applications may decide not to support this feature at all. Some applications of floor control, such as write access to a shared document, are useful even for "conferences" with two members, while other resources, such as an audio channel, may only make floor control worthwhile for larger groups.

In general, floor control is closely related to the management of shared resources in operating systems and distributed systems. Synchronization, mutual exclusion and the reader-writer problem have become standard tools in those areas. However, floor control differs in that it generally involves managing access by human participants, with a much stronger emphasis on policies.

A focus is defined as an SIP user agent that is addressed by a conference Uniform Resource Identifier (URI). The focus maintains an SIP signaling relationship with each participant in the conference. The focus is responsible for ensuring, in some way, that each participant receives the media that make up the conference. The focus also implements conference policies. The focus is a logical role.

A floor is defined as a set of shared resources within a conference; a single conference may have multiple floors. A conference member is a member or participant that has a signaling relationship with the conference focus, and receives one or more of the media streams that are part of the conference. A conference owner is a privileged user who defines rules for running the conference; by default, the conference creator becomes the owner, but the role can be delegated to another entity. Among other roles, the conference owner also establishes rules for floor control, by creating floors, and assigning and removing floor chairs. The conference owner may delegate some of these responsibilities to another party. The conference owner does not have to be a member in the conference.

A chair is normally a person who manages one floor by granting, denying, or revoking access privileges. The chair does not have to be a member of the conference. The chair is sometimes also referred to as the moderator. Different floors within a conference may have different chairs, and chairs may change during a conference. A conference client will therefore be either an ordinary member, or alternatively will be a chair.

As mentioned, floor control is a mechanism that enables applications or users to gain safe and mutually exclusive or non-exclusive access to the shared object or resource. A floor controller is a logical entity that manages floors. It receives requests from conference participants, the conference owner and the floor chair, and it issues protocol requests to affect conference and floor status. Depending on floor policy, the floor controller may ask the chair to approve decisions.

The floor policy is the set of rules and attributes governing operation of the floor controller. The floor policy is defined upon creation of a floor and may be modified by an authorized participant.

A floor control protocol is used to convey the floor control messages among the floor chairs (moderators) of the conference, the floor controller, the focus, and the participants of the conference. Floor control can operate at the origin of data, at a redistribution point, or at the destination. At the origin of data, floor control can ask the sender, via signaling, to suppress the generation of data. At the redistribution point, the floor controller can modify the mixing matrix, so that only media streams from certain participants are delivered to other participants. At the destination, floor control can filter incoming media or messages, so that only floor holders can affect the state of the shared resource.

We can distinguish between cooperative and coercive floor control. Cooperative floor control relies on the cooperation of the data source, while coercive floor control does not; it can function even if a participant is malicious or malfunctioning. Among the three locations of floor control, floor control at the redistribution point and at the receiver can be made coercive, while floor control at the sender is by necessity cooperative.

A floor is always coupled to one or more media session. A participant with appropriate privileges may create a floor by defining that one or more media session is now floor-controlled. As part of the creation of a floor, a chair needs to be appointed.

Typically, the ability of users to create floors is governed by the conference policy. In a simple scenario, the chair can delegate his or her responsibility to any other member of the conference. The conference policy and thus, indirectly, the conference owner defines whether or not floor control is in use and for which resources. If floor control is enabled for a particular resource or set of resources, the conference policy also defines for which resources the use of floor control is mandatory and for which it is optional.

Normally, the conference owner creates a floor using a mechanism and appoints the floor chair. The conference owner can remove the floor at any time (so that the resources are no longer floor-controlled), change the chair, or change the floor parameters. The chair controls the access to the floor, according to the conference policy.

SIP supports the initiation, modification, and termination of media sessions between user agents. These sessions are managed by SIP "dialogs," which represent an SIP relationship between a pair of user agents. Because dialogs are between pairs of user agents, SIP's usage for two-party communications (such as a phone call), is relatively obvious. Communications sessions with multiple participants (i.e. conferencing) is more complicated.

SIP can support many models of multi-party communications. One, referred to as "loosely coupled conferences," makes use of multicast media groups. In the loosely coupled model, there is no signaling relationship between participants in the conference. There is no central point of control or conference server. In another model, referred to as "fully distributed multiparty conferencing," each participant maintains a signaling relationship with each other participant, using SIP. There is no central point of control; it is completely distributed amongst the participants. SIP does not yet support this model.

In a further model, sometimes referred to as the "tightly coupled conference," there is a central point of control. Each participant connects to this central point. It provides a variety of conference functions, and may possibly perform media mixing functions as well. Tightly coupled conferences are not directly addressed by the SIP specification, although basic ones are possible without any additional protocol support.

Figure 1:
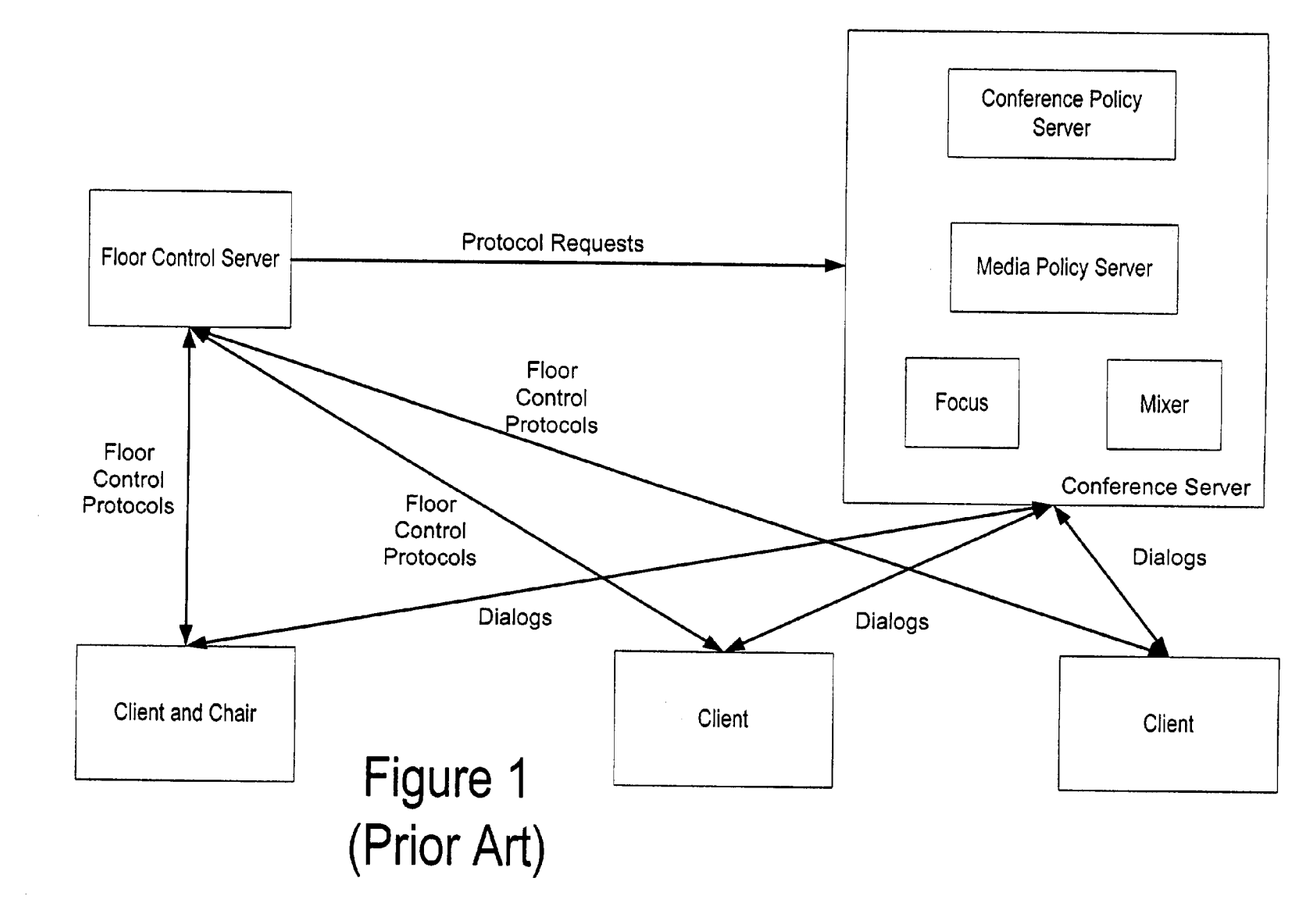
FIG. 1 depicts how floor control integrates into the overall conferencing architecture, according to the prior art.

FIG. 1 depicts how floor control integrates into the overall conferencing architecture. As mentioned, the "focus" is an SIP user agent that is addressed by a conference URI. The focus maintains an SIP signaling relationship with each participant in the conference. The focus is responsible for insuring, in some way, that each participant receives the media that make up the conference. The focus also implements conference policies. The focus is a logical role. Participants or "clients" are user agents, each identified by a URI, which are connected to the focus for a particular conference. A "conference policy server" is a logical function which can store and manipulate rules associated with participation in a conference. These rules include directives on the lifespan of the conference, who can and cannot join the conference, definitions of roles available in the conference and the responsibilities associated with those roles, and policies on who is allowed to request which roles. The conference policy server is a logical role. A "media policy server" is a logical function which can store and manipulate rules associated with the media distribution of the conference. These rules can specify which participants receive media from which other participants, and the ways in which that media is combined for each participant. In the case of audio, these rules can include the relative volumes at which each participant is mixed. In the case of video, these rules can indicate whether the video is tiled, whether the video indicates the loudest speaker, and so on. A "mixer" receives a set of media streams, and combines their media in a type-specific manner, redistributing the result to each participant. A "conference server" is a physical server which contains, at a minimum, the focus, but may also include a media policy server, a conference policy server, and a mixer. A "floor control server" is another term for "floor controller," and is responsible for determining which participant(s) in a conference are allowed to speak at any given time, based on participant requests as well as access rules and the chair's decisions.

Many existing conference management protocols have already defined floor control functions. Floor control can be used to avoid or resolve conflicts among simultaneous media inputs. For example, at a given time, the moderator of a floor can ensure that only one person is heard by other participants or one person types into a shared document. The conference models can be centralized or non-centralized. In a centralized model, such as a tightly coupled conference already discussed, there is typically one conference server acting as the root of a conference. The root conference server receives all floor requests and can control the propagation of media in the conference directly or through sending requests to other conference servers in a tree topology. There is no such root conference server in the non-centralized model. The present application is primarily concerned with the centralized model. In the rest of this document, we simply use the term conference server to refer to the root conference server, as shown in FIG. 1.

The conference server needs to be able to control the shared resources. For example, the mixer in a conference server can selectively choose the media sources for mixing. The moderators and participants of the conference should be able to send "floor control commands" to the conference server to change floor status, and the conference server should notify the moderators and participants of changes.

A floor control protocol is used to convey the floor control messages among the moderator or moderators of the conference, the conference server and the participants of the conference. The floor control protocol does not deal with the conference management such as how to elect the moderator of the conference or how to add users to the conference.

Unfortunately, the current IETF floor control protocol concept enables only simple floor control models, i.e. it assumes that there is a floor chair deciding whether to accept a claim to a floor. Many useful floor policies are impossible with this scheme. For example, the push to talk (PTT) concept does not have chair control but instead has a very different floor policy. Another example that is incompatible with the current IETF concept is a floor policy according to which "senior-members can talk anytime overriding other speakers and users in floor claim queue." Currently, the IETF floor control mechanism requires a floor chair specifically accepting or denying a user's claim to the floor. Therefore, other policies, such as "senior-members get 60 second talk time" or "user talking first time gets 30 seconds, loses floor after 3 second idle" are not possible. Similarly, as mentioned, a PTT type of floor policy used in audio chats is currently not possible.

DISCLOSURE OF THE INVENTION

The present invention provides an extension to the IETF floor control concept, thereby allowing arbitrarily complex floor policies, such as in PTT. This invention defines an extension to the IETF floor control model. This invention defines the idea of using a separate floor control language (FCL) which can be used to express these kind of floor policies so that the PTT concept (and other floor policies) can be achieved using a standard IETF mechanism.

This invention proposes that a separate floor control language (FCL) is defined. FCL can be implemented, for example, using extensible markup language (XML) or another scripting language. FCL can express complex floor policies, such as "first time user gets the floor for 30 seconds, loses it after 3 seconds of idle time." An FCL module also knows how many times a user has accessed the floor, and to which category the user belongs (e.g. different policies may be given to guru/manager/engineer categories). This knowledge can be utilized in the floor policy.

Audio chats are also important users of this invention, since FCL enables implementations such as "second speaker in topic can have 15 seconds to speak, then randomly select (from those who would speak) a next speaker for 10 seconds." Audio chat would be similar to current text chats popular in the Internet, so that there could be anonymous audio chats in Internet portals.

The current IETF approach fits well with some audio conferences in which users ask permission from the chair to speak, but frequently a more useful approach is that floor policy is at least partially defined beforehand. This allows faster and simpler operation during a conference, in which, for example, a first speaker gets the floor for a maximum of 30 seconds, and loses it after 5 idle seconds.

FCL script is defined and uploaded to the server using the same floor control protocol mechanism that is currently used for chair-controlled simple floor models. This invention can utilize xs:any scheme in current IETF floor control protocol specification, which allows additional information to be included when the floor is created or modified. This will also be a very important extension for the PTT concept, which uses a similar floor policy.

In summary, the present invention is a method of floor control for enabling at least one particular conference participant to access a shared object or resource, for purposes of input. The method includes sending a floor control command signal, and establishing at least one floor control policy in response to the floor control command signal. The floor control command signal includes a floor control language script for automatically determining the access.

The present invention is also a system of floor control for enabling at least one particular conference participant to access a shared object or resource to provide input, comprising user equipment that is capable of sending a floor control command signal, and also comprising at least one server for establishing at least one floor control policy in response to the floor control command signal. The floor control command signal includes a floor control language script for automatically determining the access. The at least one server will typically include a conference server and/or a floor control server.

It will be useful for the floor control script to further determine durations of the access, and for the floor control script to function in the absence of a floor chair or floor moderator. It has been found that the floor control language script can be provided by a wildcard which accompanies a parameter used to create or modify the floor. The durations of access will advantageously depend upon whether a particular conference participant is first to access the object or resource. The durations of access can also depend upon whether the idle time during the access reaches a prescribed level, so that access will end if a participant is not utilizing that access for significant periods of time.

The method of this invention will often need to include monitoring how many times users have accessed the shared object or resource, and also monitoring what category the users belong to, so that access to the shared object or resource will be in response to the monitoring, as well as in response to the floor control language script. Of course, the access will then have a longer duration for users belonging to a senior category, and shorter duration for the users who have previously obtained the access. A particularly useful context for this invention would be for audio access to an internet portal, in which case it will often be desirable for the floor control language script to provide the access to random users under certain circumstances. The present invention includes the very convenient idea that the floor control language script is defined and uploaded to a conference server using a floor control protocol mechanism substantially identical to a chair-controlled protocol method. The floor control language script is then used for determining the access in tandem with, or subject to override by, or in the absence of, a chair or moderator of the floor.

BEST MODE FOR CARRYING OUT THE INVENTION

The present invention is to provide a Floor Control Language (FCL) for setting or resetting floor policy without always needing a chair (i.e. a moderator). This means that chairs can be dispensed with in some situations.

Floor control messages can be divided into two categories: floor control events and floor control commands. The conference server sends floor control events to chairs or participants to report changes in the resource status. The SIP events architecture is well fitted for conveying floor control events. Chairs or participants send floor control commands to the conference server to change the status of resources. Floor control commands are like remote-procedure calls from the chairs or the participants to the conference server. Simple Object Access Protocol (SOAP) can be used to transmit floor control commands. SOAP messaging most commonly uses HTTP as the transport protocol. However, SIP can also be used to carry the SOAP content. The same mechanism can be used for general conference control. In the centralized conference model, floor claims are ordered in queues at the conference server. Floor chairs can assert priority or reorder the claims in the queues.

The floor chairs and participants (i.e. clients) of the conference should be able to send "floor control commands" to the conference server to change floor status, and the conference server should notify the moderators and participants of these changes. Floor control commands can advantageously be encapsulated in SOAP and be sent from the user to the conference server in order to change floor status. The following table shows various important floor control commands. In this table, the 'Server' refers to the "Conference server" and the "User" refers to either the "Chair" or "Participant."

| Command Name | Command Description | Issuer to Receiver |
| --- | --- | --- |
| CreateFloor | Create a floor for some resources | Chair to Server and Clients |
| RemoveFloor | Remove floors for some Resources | Chair to Server |
| ChangeConfig | Change the configuration of a floor | Chair to Server |
| ClaimFloor | Request a floor | User to Server |
| ReleaseFloor | Give up a floor | User to Server |
| GrantFloor | Grant a floor to some users | Chair to Server |
| RevokeFloor | Force release floors from some users | Chair to Server |
| RemoveClaims | Remove some existing floor claims | User to Server |
| ReorderClaims | Reorder some claims in the queue | Chair to Server |

The CreateFloor command creates a floor for some resources and users; only chairs can execute this command. The CreateFloor command takes one parameter (floor) to create a new floor for some resources; the parameter "floor"

has the type "floorType." The response of the method is a boolean value indicating whether the floor is successfully created or not.

The RemoveFloor command deletes floors for several resources. Only chairs can execute this command. The RemoveFloor command takes one parameter (resources) which has the type resourcesType. The response of the method is a boolean value indicating whether the floor has been successfully removed or not.

The ChangeConfig command changes a floor's configuration. Only command chairs can execute this command. The parameters for the ChangeConfig command are the same as for the CreateFloor command. The response indicates whether the configuration is successfully changed or not.

When a user wants to request a floor, the user's user agent (UA) should send a claimFloor command to the conference server. The holder of a floor can also use the claimFloor command to extend the holding time. For new claims, the response of the method is a boolean value indicating whether the claim has been successfully put into the claim queue. For updating an existing claim, the response indicates whether the existing claim is updated successfully.

To release a floor, the user's UA can send a ReleaseFloor command to the conference server. The ReleaseFloor command takes one parameter (holding) which has the type holdingType. The sender of the command should be the same as the sub-element 'user' of the holding parameter.

The GrantFloor command grants floors to one or more users. The parameter "holding," which has the type "holdingType," defines the relationship between the floors and the holders. The parameter "claim," which has the type "claimType," specifies the claim that the floor is granted for. The claim must be removed from the queue. If the "claim" parameter is not provided, the GrantFloor command does not affect the claim queue. Only chairs can execute this command.

The RevokeFloor command forces the release of a floor from the current holders. The parameter "holding" indicates which floor should be revoked. Only chairs can execute this command.

The RemoveClaims command removes several claims from the claim queue. Chairs can remove any claims. Participants can only remove their own claims. The RemoveClaims command takes one parameter, claims. The return value indicates whether the claims have been removed successfully.

The RemoveClaims command changes the order of the claims in the queue. Only chairs can execute this command. This command supports some simple operations to change a single claim's position. It takes three parameters. The parameter "resources" indicates the claim queue to operate. The parameter "claim" indicates which claim to move. The parameter "operation" defines how to move the claim.

Each resource should have its own floor claim queue so that people interested in one resource will not get notified regarding another resource's claim. However, if multiple resources are granted or denied as a group, the conference server must use one floor claim queue for all the resources.

The floor claim queue is created when executing a CreateFloor command. The parameter of the command defines the resources the floor applies. When a conference server receives a claimFloor command, the conference server should append the new claims at the end of the queue. If the current floor holder releases the floor, the claim at the front of the queue should automatically get the floor. The fulfilled claims must be removed from the claim queue. In one claim request, a user may claim multiple resources in different floor claim queues. The claim will be appended to all the applicable queues. To avoid potential deadlock, the claims in different queues must be granted independently. When a conference server receives a GrantFloor command, the conference server should queue the grant until there is an available floor. An occupied floor can be released by ReleaseFloor and RevokeFloor commands.

According to this invention, a floor creator has the ability to specify complicated floor control policies, for example, "senior members get 5 minutes to talk, junior members 2 minutes and visitors 1 minute." In a best mode embodiment, a floor control language (FCL) describes these policies, and a wildcard "xs:any" in the floorType carries these policies to the conference server.

The floorType is used to define a floor, and contains an optional attribute and several sub-elements. The wildcard "xs:any" in the floorType is used to provide additional information about the floor, such as the complicated floor control policies.

The optional attribute 'maxHolders' in the floorType defines how many users can hold the floor simultaneously. The default value of the 'maxHolders' is 1. There are three sub-elements in the floorType: resources, users, and moderators. The element "resources" has the type "resourcesType." It lists the resources the floor controls. If it is not provided, the floor controls all the resources of the conference. The element "users" has the type "usersType." It defines who can hold the floor. If it is not provided, every user in the conference can hold the floor. The element "moderators" has the type "moderatorsType." It defines who are the moderators of the floor. If it is not provided in the CreateFloor command, the user who sends the FloorCreate command will serve as the moderator. If the element "moderators" is not provided in a floor control notification, it means this information is hidden by the conference server.

Figure 2:
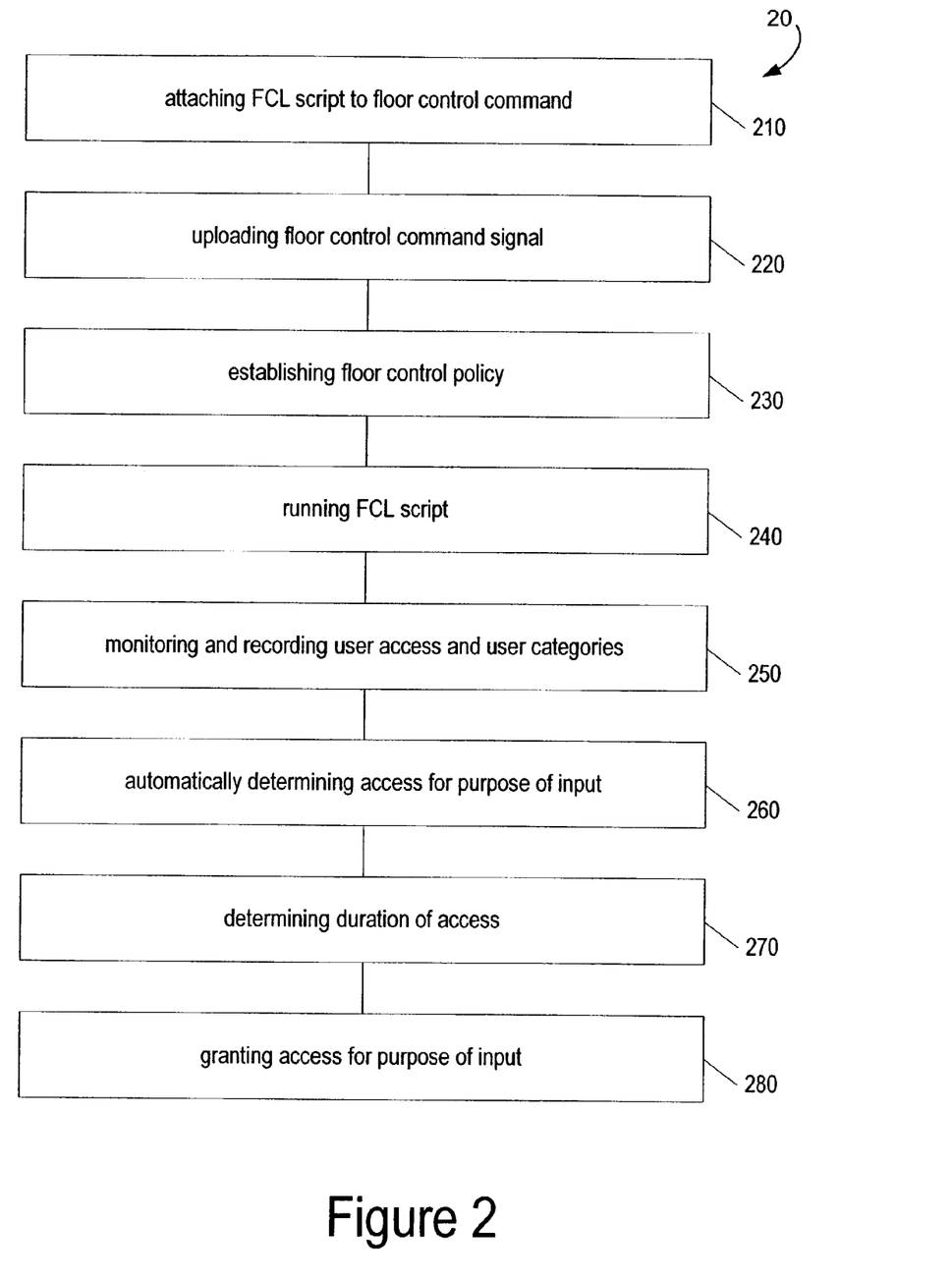
FIG. 2 is a flow chart depicting an embodiment of the present invention.

A best mode embodiment of the present invention can be depicted in a flow chart, as seen in FIG. 2. The method 20 begins with attaching 210 a floor control language (FCL) script to a floor control command. Then this command is uploaded 220. Once the upload is complete, the floor control policy will be established 230. The FCL script will then be run 240, and user access will be monitored and recorded 250. Access will then be determined 260 for purposes of inputting data into the shared resource. Not only who gets access, but also the duration of that access must be determined 270, and then the access will finally be granted 280.

Figure 3:
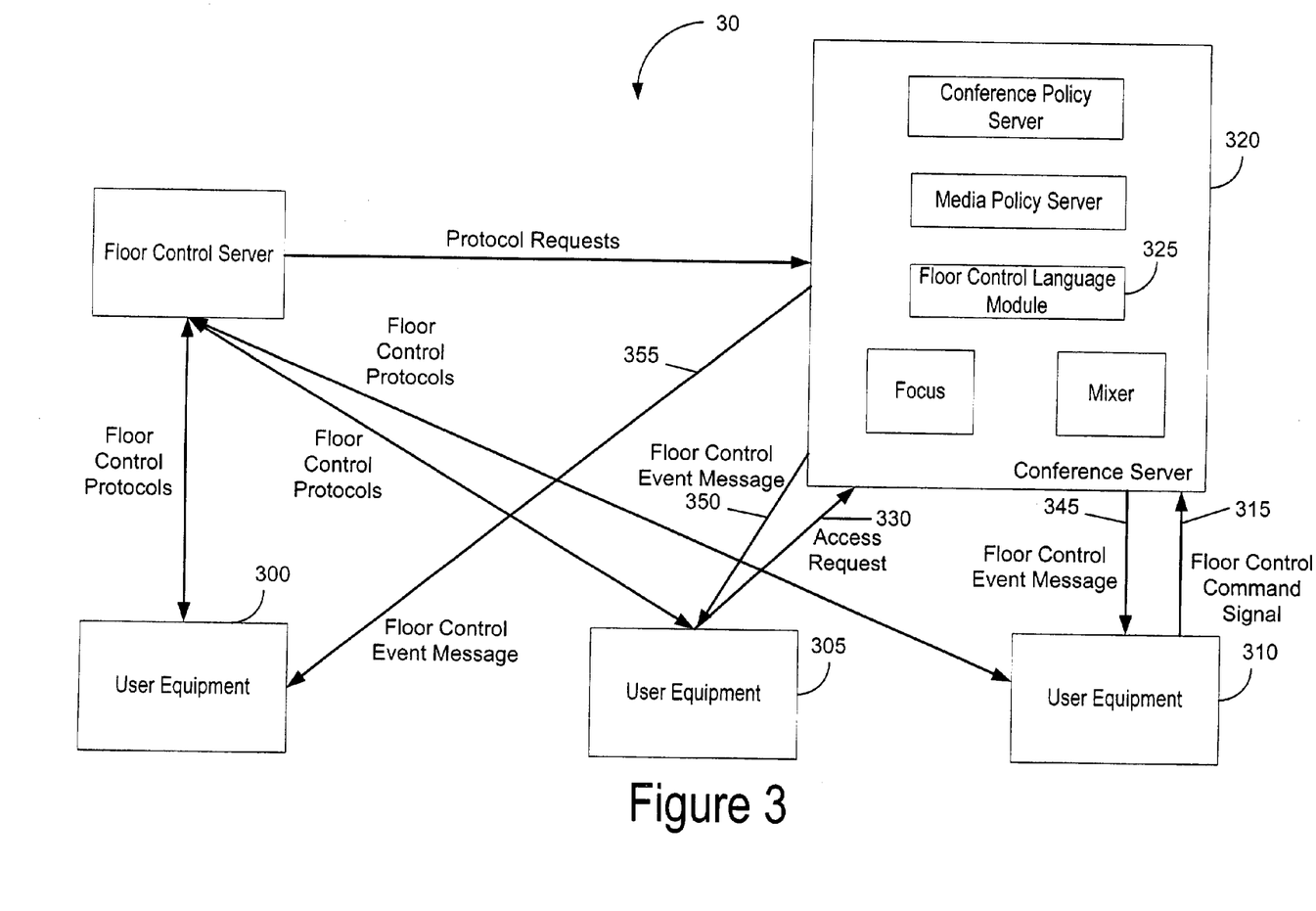
FIG. 3 is a block diagram illustrating a system according to a best embodiment of the present invention.

FIG. 3 illustrates a system 30 for implementing an embodiment of the present invention. This system of floor control is for enabling at least one particular conference participant, such as user equipment 300, 305, or 310, to access a shared object or resource to provide input. A user means a client other than a chair. A user equipment 310 sends a floor control command signal 315 to the conference server 320 which establishes at least one floor control policy in response to the floor control command signal 315. The floor control command signal includes a floor control language script for automatically determining the access. The conference server includes a floor control language module 325 for monitoring and memorizing past floor access of users. Any user equipment 305 is also for sending an access request signal 330 whenever the user wants access in order to input into the shared object or resource. The server 320 changes resource status automatically, in response to the access request signal 330, and in accordance with the floor control policy appropriate to the past floor access memorized by the floor control language module 325. For example, if a user has already had a relatively large amount of floor access, then the floor control policy may dictate that such a user has low priority for further access. The server sends a floor control event message 345, 350, 355 reporting changes in the resource status to the user equipments. The floor control language script is sufficient to obviate a floor chair, and provides at least one floor policy that depends upon the past floor access.

It is to be understood that all of the present Figures, and the accompanying narrative discussions of the best mode embodiments, do not purport to be completely rigorous treatments of the method under consideration. A person skilled in the art will understand that the steps and signals of the present application represent general cause-and-effect relationships that do not exclude intermediate interactions of various types, and will further understand that the various steps and structures described in this application can be implemented by a variety of different combinations of hardware and software which need not be further detailed herein.

What is claimed is:

1. A method of floor control for enabling at least one particular conference participant to access a shared object or resource for purposes of input during the conference, comprising the steps of:
   sending a floor control command signal, and
   establishing at least one floor control policy in response to the floor control command signal,
   wherein the floor control command signal includes a floor control language script for automatically determining the access of the conference participant to the shared object or resource for purposes of input,
   wherein the floor control script further determines durations of the access, and
   wherein the floor control script functions in the absence of a floor chair and floor moderator.

2. A method of floor control for enabling at least one particular conference participant to access a shared object or resource for purposes of input during the conference, comprising the steps of:
   sending a floor control command signal, and
   establishing at least one floor control policy in response to the floor control command signal,
   wherein the floor control command signal includes a floor control language script for automatically determining the access of the conference participant to the shared object or resource for purposes of input
   wherein the floor control language script is provided by a wildcard which accompanies a parameter, and wherein the parameter is used to create or modify a floor.

3. A method of floor control for enabling at least one particular conference participant to access a shared object or resource for purposes of input during the conference, comprising the steps of:
   sending a floor control command signal, and
   establishing at least one floor control policy in response to the floor control command signal,
   wherein the floor control command signal includes a floor control language script for automatically determining floor access of the conference participant to the shared object or resource for purposes of input,
   the method further comprising the steps of:
      monitoring how many times users have accessed the shared object or resource, and what category the users belong to, and
      providing the access in response to the monitoring, and also in response to the floor control language script.

4. A method of floor control for enabling at least one particular conference participant to access a shared object or resource for purposes of input during the conference, comprising the steps of:
   sending a floor control command signal, and
   establishing at least one floor control policy in response to the floor control command signal,
   wherein the floor control command signal includes a floor control language script for automatically determining the access of the conference participant to the shared object or resource for purposes of input
   wherein the floor control language script provides the access to random users under specific circumstances, wherein the access is audio access, and wherein the audio access is to an internet portal.

5. A method of floor control for enabling at least one particular conference participant to access a shared object or resource for purposes of input during the conference, comprising the steps of:
   sending a floor control command signal, and
   establishing at least one floor control policy in response to the floor control command signal,
   wherein the floor control command signal includes a floor control language script for automatically determining the access of the conference participant to the shared object or resource for purposes of input; the method further comprises the step of:
   memorizing past floor access of users,
   sending an access request signal,
   changing resource status automatically, in response to the access request signal, and in accordance with the floor control policy appropriate to the past floor access, and
   sending a floor control event message reporting changes in the resource status,
   wherein the floor control language script is sufficient to obviate a floor chair, and
   wherein the floor control language script provides at least one policy that depends upon the past floor access.

6. A system of floor control for enabling at least one particular conference participant to access a shared object or resource to provide input during the conference, comprising:
   user equipment, for sending a floor control command signal; and
   at least one server for establishing at least one floor control policy in response to the floor control command signal,
   wherein the floor control command signal includes a floor control languages script for automatically determining floor access of the conference participant to the shared object or resource for providing the input
   wherein the floor control script is for further determining durations of the access, and
   wherein the floor control script is functional in the absence of a floor chair and floor moderator.

7. A system of floor control for enabling at least one particular conference participant to access a shared object or resource to provide input during the conference, comprising:
   user equipment, for sending a floor control command signal; and
   at least one server for establishing at least one floor control policy in response to the floor control command signal,
   wherein the floor control command signal includes a floor control languages script for automatically determining floor access of the conference participant to the shared object or resource for providing the input wherein the floor control language script is transferable by a wildcard which accompanies a parameter, and wherein the parameter is for creating or modifying a floor.

8. A system of floor control for enabling at least one particular conference participant to access a shared object or resource to provide input during the conference, comprising:
   user equipment, for sending a floor control command signal; and
   at least one server for establishing at least one floor control policy in response to the floor control command signal,
wherein the floor control command signal includes a floor control language script for automatically determining floor access of the conference participant to the shared object or resource for providing the input, the system further comprising:
   a floor control language module for monitoring how many times users have respectively accessed the shared object or resource, and for monitoring what category the users respectively belong to; and
   wherein the at least one server provides the access in response to the monitoring, and also in response to the floor control language script.

9. A system of floor control for enabling at least one particular conference participant to access a shared object or resource to provide input during the conference, comprising:
   user equipment, for sending a floor control command signal; and
   at least one server for establishing at least one floor control policy in response to the floor control command signal,
   wherein the floor control command signal includes a floor control languages script for automatically determining floor access of the conference participant to the shared object or resource for providing the input
   wherein the floor control language script is for providing the access to random users under specific circumstances, wherein the access is audio access, and wherein the audio access is to an internet portal.

10. A system of floor control for enabling at least one particular conference participant to access a shared object or resource to provide input during the conference, comprising:
    user equipment, for sending a floor control command signal; and
    at least one server for establishing at least one floor control policy in response to the floor control command signal,
    wherein the floor control command signal includes a floor control languages script for automatically determining floor access of the conference participant to the shared object or resource for providing the input; the system further comprising:
    a floor control language module for memorizing past floor access of users,
    wherein the user equipment is also for sending an access request signal,
    wherein the at least one server is also for changing resource status automatically, in response to the access request signal, and in accordance with the floor control policy appropriate to the past floor access,
    wherein the at least one server is also for sending a floor control event message reporting changes in the resource status,
    wherein the floor control language script is sufficient to obviate a floor chair, and
    wherein the floor control language script provides at least one policy that depends upon the past floor access.

11. The method of claim 1, wherein the durations of access depend upon whether the at least one particular conference participant is first to access the object or resource.

12. The method of claim 11, wherein the durations of access also depend upon whether the idle time during the access reaches a prescribed level.

13. The method of claim 1, wherein the floor control language script is defined and uploaded using a floor control protocol mechanism substantially identical to a chair-controlled protocol mechanism.

14. The method of claim 1, wherein the floor control language script is used for determining the access in tandem with, or subject to override by, a chair or moderator of the floor.

15. The method of claim 3, wherein the access has longer duration for the users belonging to a senior category, and wherein the access has shorter duration for the users that have previously obtained the access.

16. The system of claim 6, wherein the durations of access depend upon whether the at least one particular conference participant is first to access the object or resource.

17. The system of claim 16, wherein the durations of access also depend upon whether the idle time during the access reaches a prescribed level.

18. The system of claim 6, wherein the floor control language script is defined and uploadable using a floor control protocol mechanism substantially identical to a chair-controlled protocol mechanism.

19. The system of claim 6, wherein the floor control language script is for determining the access in tandem with, or subject to override by, a chair or moderator of the floor.

20. The system of claim 8, wherein the access has longer duration for the users belonging to a senior category, and wherein the access has shorter duration for the users that have previously obtained the access.

* * * * *

UNITED STATES PATENT AND TRADEMARK OFFICE
CERTIFICATE OF CORRECTION

PATENT NO. : 7,085,244 B2 Page 1 of 1
APPLICATION NO. : 10/384359
DATED : August 1, 2006
INVENTOR(S) : Koskelainen et al.

It is certified that error appears in the above-identified patent and that said Letters Patent is hereby corrected as shown below:

At col. 9, line 31, prior to "access", please change "the" to --floor--; and at line 46, prior to "access", please change "the" to --floor--.

At col. 10, line 10, prior to "access", please change "the" to --floor--; and at line 25, prior to "access", please change "the" to --floor--.

Signed and Sealed this

Nineteenth Day of June, 2007

JON W. DUDAS
*Director of the United States Patent and Trademark Office*